Patented Dec. 20, 1949

2,491,496

UNITED STATES PATENT OFFICE 2,491,496

SYNTHETIC DRYING OILS

Warren W. Johnstone, Riverside, Ill., assignor to Universal Oil Products Company, Chicago, Ill., a corporation of Delaware No Drawing. Application December 24, 1947, Serial No. 793,766

3 Claims. (Cl. 196—149)

This application is a continuation-in-part of my co-pending application Serial Number 512,271 filed November 29, 1943, now Patent Number 2,440,477, which in turn is a continuation-in-part of my application Serial Number 469,037, filed December 14, 1942, now abandoned.

This invention relates to synthetic drying oils and particularly to highly unsaturated hydrocarbon drying oils.

An object of this invention is a drying oil produced by treatment of aliphatic hydrocarbons.

Another object of this invention is a hydrocarbon drying oil produced by the treatment of olefinic hydrocarbons with hydrogen fluoride.

A further object of this invention is the preparation of a hydrocarbon oil having the properties of a drying oil and suitable for use in varnishes, paints, and other protective and decorative coatings.

Broadly, my invention comprises a product formed by reacting a hydrocarbon charging stock in the presence of hydrogen fluoride, separating the reaction mixture into a hydrocarbon phase and a hydrogen fluoride phase, and recovering from the hydrogen fluoride phase an oil having drying properties, that is an oil capable of forming thin films which dry to form protective coatings.

One specific embodiment of this invention comprises a drying oil formed by reacting aliphatic hydrocarbons in the presence of hydrogen fluoride, introducing the reaction mixture into a settling zone to form an upper hydrocarbon layer and a lower hydrogen fluoride layer containing highly unsaturated hydrocarbon material, separating hydrogen fluoride from said hydrogen fluoride layer and recovering substantially fluorine-free highly unsaturated hydrocarbon material having properties of a drying oil.

Another embodiment of this invention comprises a drying oil formed by reacting olefin hydrocarbons in the presence of hydrogen fluoride, introducing the reaction mixture into a settling zone to form an upper hydrocarbon layer and a lower hydrogen fluoride layer containing highly unsaturated hydrocarbon material, separating hydrogen fluoride from said hydrogen fluoride layer and recovering substantially fluorine-free highly unsaturated hydrocarbon material having properties of a drying oil.

When hydrocarbon reactions are carried out in the presence of hydrogen fluoride catalyst, the used catalyst contains certain valuable organic materials. It is this organic material which can be recovered from the used catalyst that is referred to in this specification and claims as a drying oil. It is believed that some of the hydrocarbon components of the drying oil are entrained physically or are dissolved in the used hydrogen fluoride catalyst while the remainder are combined with hydrogen fluoride in the form of complex compounds. In some cases, the unsaturated hydrocarbon material recovered from the hydrogen fluoride layer contains a small proportion of organic fluoride which is removed by suitable purification treatment as by contacting with activated alumina, bauxite, aluminum fluoride, etc.

Conversion processes which employ hydrogen fluoride as catalyst and in which a catalyst layer containing unsaturated hydrocarbons is formed during reaction include the polymerization of normally gaseous and normally liquid olefin hydrocarbons, the alkylation of isoparaffins with olefins, the alkylation of aromatic hydrocarbons with olefins and the like.

Although drying oils prepared from olefin containing charging stocks are preferred, drying oils can also be prepared from other aliphatic hydrocarbon charging stocks such as branched chain paraffins. In processes such as those previously mentioned herein, the reaction mixture is allowed to settle and the catalyst layer is separated from the upper hydrocarbon layer. This catalyst layer contains hydrogen fluoride and the unsaturated hydrocarbons which comprise the drying oil product of my invention. In general, hydrocarbon material recovered from the hydrogen fluoride catalyst layer comprises a series of hydrocarbons of rather wide boiling range and having more than two double bonds per molecule. The exact composition of the drying oil varies somewhat depending upon the particular charging stocks and the conditions employed in the treating operation.

A typical operation for the production of the drying oils of my invention may be carried out according to the following description. A hydrocarbon charge containing normally gaseous and/or normally liquid olefins is treated in the presence of hydrogen fluoride at sufficient pressure to maintain the reaction mixture in substantially liquid phase, said pressure usually being below about 500 pounds per square inch. Intimate contact between the hydrocarbons and catalyst may be maintained by some form of agitation, such as mixing, stirring, etc., so as to form a mixture of emulsion of hydrocarbon and hydrogen fluoride. A reaction temperature of from about 0° to about 300° F. and preferably from about 50° to about 200° F. is usually employed. Upon completion of the reaction, the products are allowed to settle, and a saturated hydrocarbon layer is separated from the catalyst layer which comprises chiefly hydrogen fluoride and a hydrocarbon drying oil. The hydrogen fluoride layer is then directed to a recovery zone wherein hydrogen fluoride is separated by distillation or other suitable means and recycled to the reaction zone.

The hydrocarbon material remaining after removal of hydrogen fluoride may be treated in a number of ways to remove any free hydrogen fluoride remaining and to obtain a purified drying oil. A simple method of further treating the drying oil comprises either steam distillation or vacuum distillation to recover an oil having the desired properties.

Alternately, the purified drying oil may be recovered by commingling the hydrogen fluoride catalyst layer with water. The water serves to dissolve any free hydrogen fluoride that is present while the unsaturated hydrocarbon oil rises to the top of the aqueous solution and may be withdrawn. If desired, the fluidity of the drying oil may be increased by commingling it with a non-reactive hydrocarbon solvent such as pentane, and after thoroughly mixing, the solution is treated with a suitable alkaline reagent to neutralize any remaining free acid. The treated mixture is directed to a separation zone in which the hydrocarbon solvent is removed by suitable means such as by distillation and the finished drying oil is recovered, while the hydrocarbon solvent may be recycled to further use.

The drying oil product is a sweet smelling liquid ranging in color from light yellow to dark brown and drying to a hard film on exposure to air. This drying oil has a wide boiling range of from about 150° to about 400° C., density of from about 0.83 to about 0.93, index of refraction of from about 1.47 to about 1.53, specific dispersion values of from about 125 to about 160 (usually between about 135 and about 145), bromine number above about 140 (although they vary with the average molecular weight), maleic anhydride values of from about 40 to about 95 (usually in the range of from about 50 to about 80), acid numbers below about 3, average number of olefinic double bonds per molecule varying between about 2.5 and about 3.5, of which from about 40 to about 70% are conjugated, and average molecular weights of from about 200 to about 400, although the usual average is in the neighborhood of about 300. Some unsaturated hydrocarbon fractions of the drying oil have also been prepared in which the hydrocarbons have molecular weights as high as about 150 to as high as about 1000.

Study of the ultra-violet and infra-red absorption spectra of drying oil fractions boiling from about 150° to about 200° C. shows that many of these hydrocarbons contain a pair of conjugated double bonds with one of these double bonds in a ring of five carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted.

The higher boiling fractions of the drying oil boiling up to about 450° C. contain polycyclic hydrocarbons which are generally bicyclic. In both the monocyclic and polycyclic hydrocarbons the five-carbon atom ring portions of the molecules are combined with at least two alkyl or two unsaturated aliphatic groups. The data obtained on these fractions indicate that one of the double bonds comprised by the conjugated diene systems of the drying oil is within a five-carbon atom ring and the other double bond is in an alkenyl or alkapolyenyl substituent. Alkapolyenyl groups that may be present are highly branched and contain isolated unsaturation as well as conjugated unsaturation.

Some of the typical hydrocarbons contained in the drying oil mixtures are represented structurally by the following formula:

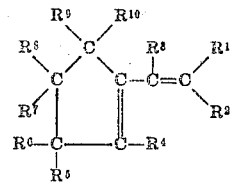

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than three of $R^1$ to $R^4$ represent hydrogen.

Other constituents of the drying oil are believed to have structures that may be represented by the formula

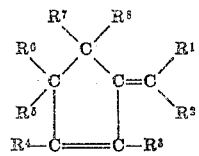

wherein $R^1$ to $R^8$ represent members of the group consisting of hydrogen and alkyl, alkenyl and alkapolyenyl hydrocarbon radicals, and at least two of the substituents $R^3$ to $R^8$ are hydrocarbon radicals.

Thus the hydrocarbons represented by each of the above formulae contain a ring of five carbon atoms, an alkenyl group, and at least one pair of conjugated double bonds per molecule.

The following data are presented to illustrate the preparation of the hydrocarbon drying oil and its characteristic properties.

*Example I*

438 grams of debutanized polymer gasoline was charged to a reactor to which was added 137 grams of hydrogen fluoride. The mixture was stirred constantly during the conversion which took place at a temperature of 100° C. and a pressure ranging from 20 to 70 pounds per square inch. After completion of the reaction, the products were directed to a settling zone wherein they were separated into an upper layer comprising essentially saturated hydrocarbons and a lower layer containing hydrogen fluoride and unsaturated hydrocarbons combined therewith. The catalyst layer was withdrawn to a distillation zone from which the hydrogen fluoride was removed and recycled to the reaction zone while the unsaturated hydrocarbon material was recovered as the preferred product of the process. 347.6 grams of the saturated hydrocarbon product was formed and 217.6 grams of catalyst layer was obtained. From the used catalyst, 104.2 grams of hydrocarbon drying oil was recovered. The properties of the drying oil were as follows:

| | |
|---|---|
| Molecular weight | 326 |
| Index of refraction ($n_D^{20}$) | 1.4929 |
| Specific dispersion | 150 |
| Density ($d_4^{20}$) | 0.872 |
| Specific refraction | 0.333 |
| Color, Gardner | 15 |
| Bromine No. | 150 |

*Example II*

438 grams of the same debutanized polymer gasoline was reacted as described in Example I, with 120 grams of hydrogen fluoride at a temperature of 38° C. 369.5 grams of hydrocarbon layer was formed, and 173.4 grams of catalyst layer. From the catalyst layer, 71.1 grams of drying oil was recovered with the following properties:

| | |
|---|---|
| Molecular weight | 277 |
| Index of refraction ($n_D^{20}$) | 1.4830 |
| Specific dispersion | 138 |
| Density ($d_4^{20}$) | 0.856 |
| Specific refraction | 0.334 |
| Color, Gardner | 12 |
| Bromine No. | 191 |

*Example III*

A drying oil fraction recovered from a catalyst layer produced when isobutane reacted with butylene under alkylating conditions in the presence of hydrogen fluoride was found to have the following properties:

| | |
|---|---|
| Molecular weight | 250 |
| Density ($d_4^{20}$) | 0.862 |
| Specific dispersion | 137 |
| Index of refraction ($n_D^{20}$) | 1.4829 |
| Double bonds per molecule | 2.8 |

When the reaction conditions were varied somewhat on the same charging material with recycle of used hydrogen fluoride, a drying oil was recovered having these properties:

| | |
|---|---|
| Molecular weight | 302 |
| Density ($d_4^{20}$) | 0.902 |
| Specific dispersion | 150 |
| Index of refraction ($n_D^{20}$) | 1.5052 |
| Double bonds per molecule | 3.7 |

*Example IV*

When isooctene was reacted in the presence of hydrogen fluoride, the drying oil fraction recovered from the catalyst phase had these properties:

| | |
|---|---|
| Molecular weight | 330 |
| Density ($d_4^{20}$) | 0.893 |
| Specific dispersion | 140 |
| Index of refraction ($n_D^{20}$) | 1.4959 |
| Double bonds per molecule | 3.6 |

A test of the drying properties of the drying oil fractions showed that they dried much faster than raw linseed oil with or without a siccative.

*Example V*

16.5 kilograms of monoolefin hydrocarbons of gasoline boiling range produced by polymerizing propylene and butylenes in the presence of solid phosphoric acid catalyst at a temperature of 225° C. were charged into a steel autoclave and rapidly stirred while 9 kilograms of anhydrous hydrogen fluoride was added to the reactor. The pressure within the autoclave was maintained at 15 atmospheres by means of added nitrogen. The reaction temperature was increased gradually from 25° C. to 90° C. and the stirring was continued for an additional hour. The reaction mixture was permitted to stand quiescent for several minutes, the mixture separated into an upper saturated hydrocarbon layer and a lower hydrogen fluoride layer. The upper layer was washed with caustic soda solution to remove small amounts of dissolved hydrogen fluoride and the resultant 8.1 kilograms of hydrocarbons were fractionally distilled to separate therefrom a gasoline boiling from about 45° to about 200° C. and having an octane number of 82.6.

The lower hydrogen fluoride layer which weighed 16.1 kilograms was a light brown mobile fluid with a density of 0.98 at a temperature of 4° C. The hydrogen fluoride layer was then diluted with water and a highly unsaturated hydrocarbon material separated from the aqueous hydrogen fluoride. This unsaturated hydrocarbon material was a sweet smelling oil and amounted to 42.4% by weight of the polymer gasoline originally charged to the autoclave. This unsaturated oil had the properties shown in the following table:

| | |
|---|---|
| Boiling range | 160° to above 400° C. |
| Density ($d_4^{20}$) | 0.863 |
| Index of refraction ($n_D^{20}$) | 1.4871 |
| Color, Gardner | 12–13 |
| Molecular weight | 263 |
| Diene number | 85 |
| Bromine number | 195 |
| Specific dispersion | 143 |
| Percent fluorine | 0.06 |
| Double bonds per molecule (average) | 3.2 |

A portion of the oil with the properties shown in the foregoing table was spread as a thin film on a glass plate and exposed to air for several days with the result that a non-tacky, tough transparent film resulted which exhibited considerable resistance to abrasion.

I claim as my invention:

1. A drying oil having a boiling range of from about 150° to about 400° C., a density of from about 0.83 to about 0.93, an index of refraction of from about 1.47 to about 1.53, a bromine number above about 140, a maleic anhydride value of from about 50 to about 80, an average of from about 2.5 to about 3.5 double bonds per molecule, and a molecular weight of from about 150 to about 1,000 formed by reacting an olefinic hydrocarbon fraction with liquid hydrogen fluoride, and recovering the drying oil from the hydrofluoric acid layer.

2. A drying oil having a boiling range of from about 150° to about 400° C., a density of from about 0.83 to about 0.93, an index of refraction of from about 1.47 to about 1.53, a bromine number above about 140, a maleic anhydride value of from about 50 to about 80, an average number of olefinic double bonds per molecule of from about 2.5 to about 3.5 of which from about 40 to about 70% are conjugated, and an average molecular weight of from about 200 to about 400 formed by reacting an olefinic hydrocarbon fraction with liquid hydrogen fluoride, and recovering the drying oil from the hydrofluoric acid layer.

3. A drying oil having a ring of five carbon atoms, an alkenyl group, at least one pair of conjugated double bonds per molecule, a boiling range of from about 150° to about 400° C., a density of from about 0.83 to about 0.93, an index of refraction of from about 1.47 to about 1.53, a bromine number above about 140, a maleic anhydride value of from about 50 to about 80, an average number of olefinic double bonds per molecule of from about 2.5 to about 3.5, and an average molecular weight of from about 200 to about 400 formed by reacting polymer gasoline with liquid hydrogen fluoride, separating the reaction mixture into a hydrocarbon layer and a used hydrogen fluoride layer containing organic material, treating said used hydrogen fluoride layer with water, and recovering a drying oil from the resultant reaction mixture.

WARREN W. JOHNSTONE.

REFERENCES CITED

The following references are of record in the file of this patent:

UNITED STATES PATENTS

| Number | Name | Date |
|---|---|---|
| 2,384,294 | Frey | Sept. 4, 1945 |
| 2,388,919 | Iverson | Nov. 13, 1945 |